Figure 1:
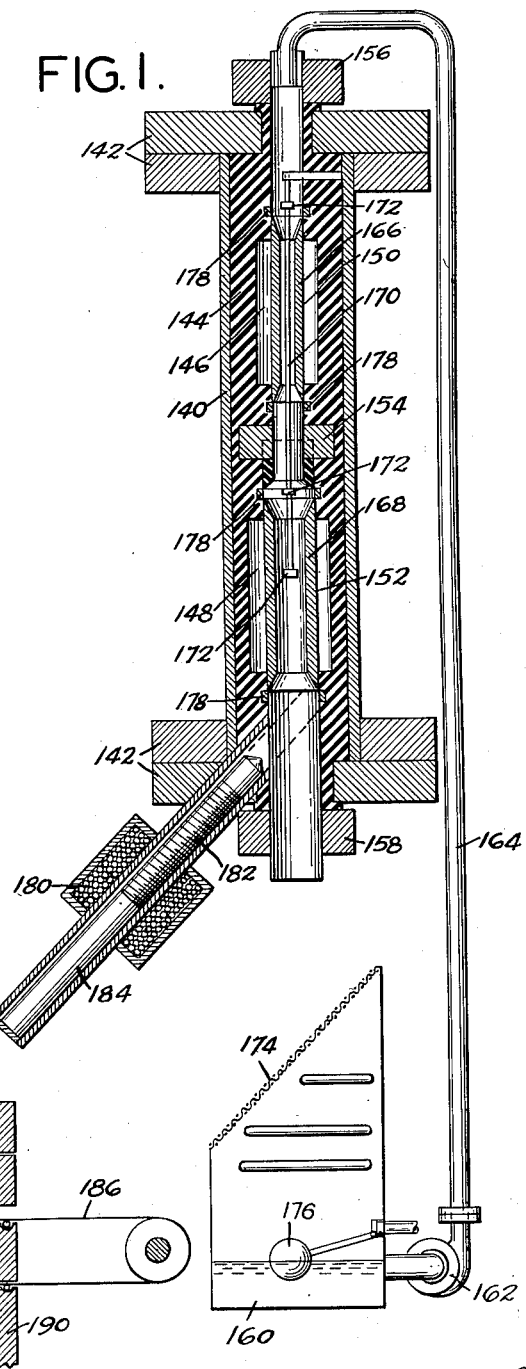

Feb. 26, 1952 C. FIELD 2,586,802
ICE-MAKING APPARATUS
Filed Aug. 30, 1946 5 Sheets-Sheet 1

INVENTOR.
CROSBY FIELD
BY
Blair, Curtis & Hayward
ATTORNEYS.

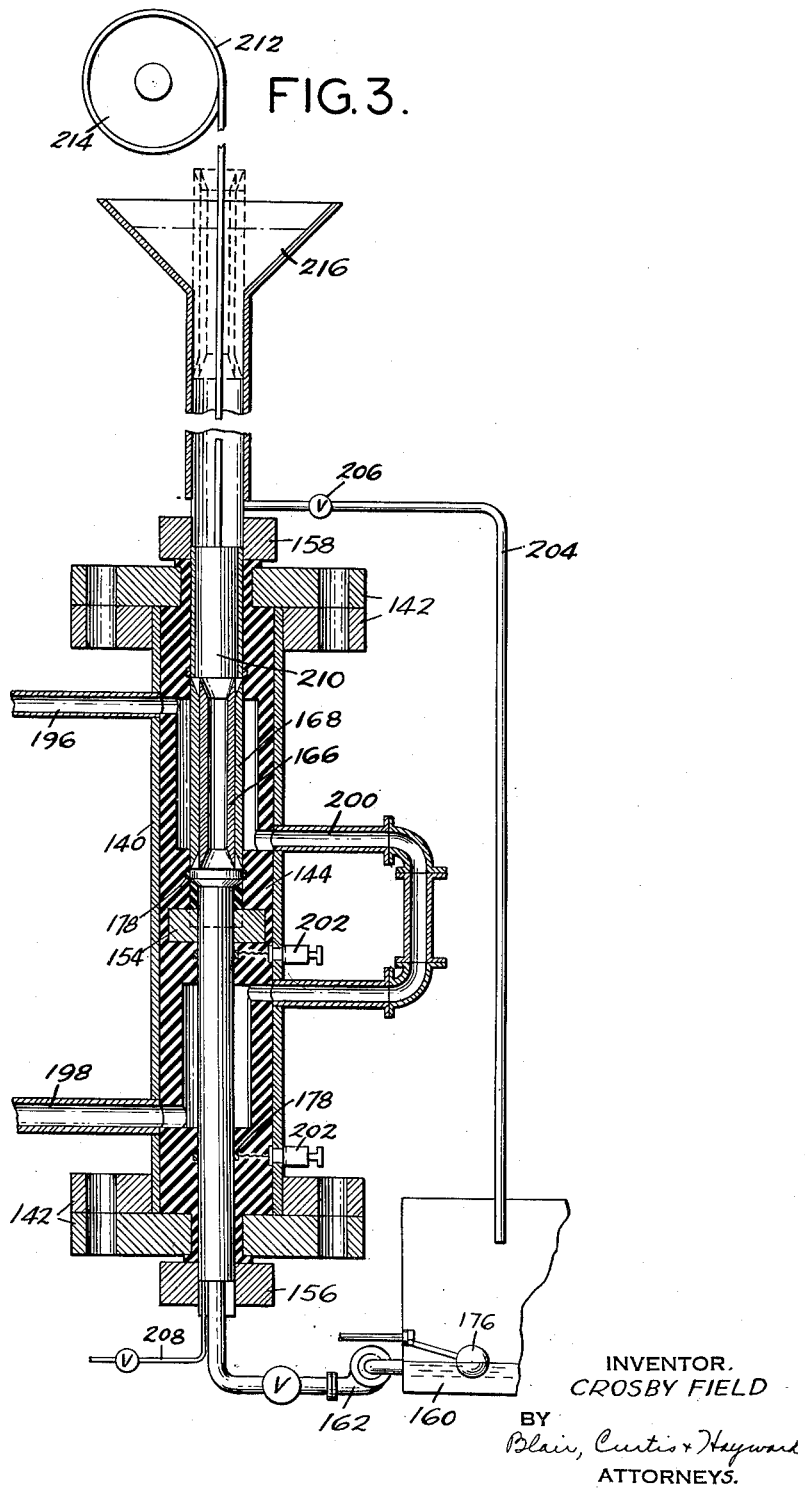

Feb. 26, 1952     C. FIELD     2,586,802
ICE-MAKING APPARATUS
Filed Aug. 30, 1946     5 Sheets-Sheet 4
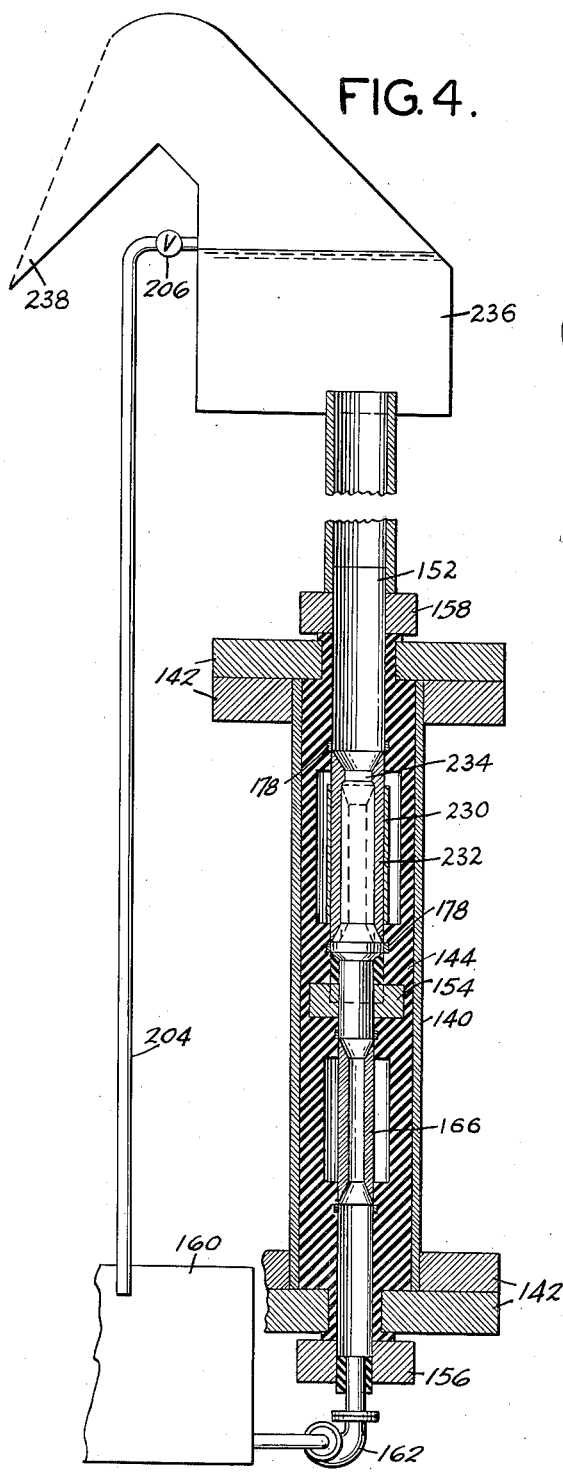
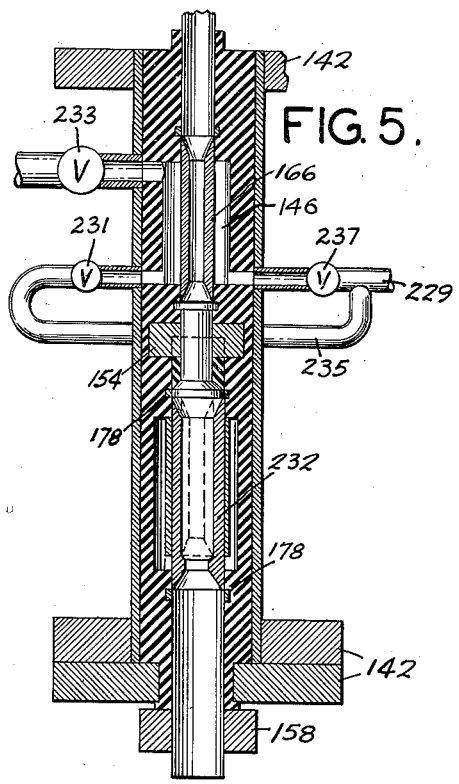
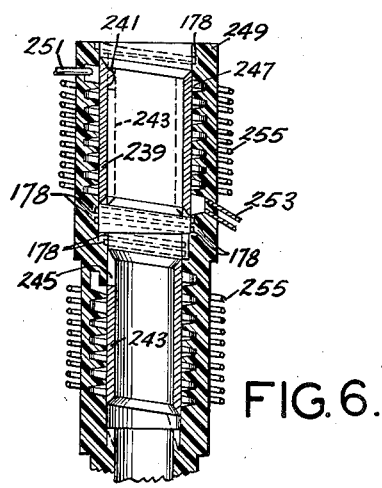
INVENTOR.
CROSBY FIELD
BY
Blair, Curtis & Hayward
ATTORNEYS.

Feb. 26, 1952          C. FIELD          2,586,802
ICE-MAKING APPARATUS
Filed Aug. 30, 1946          5 Sheets-Sheet 5
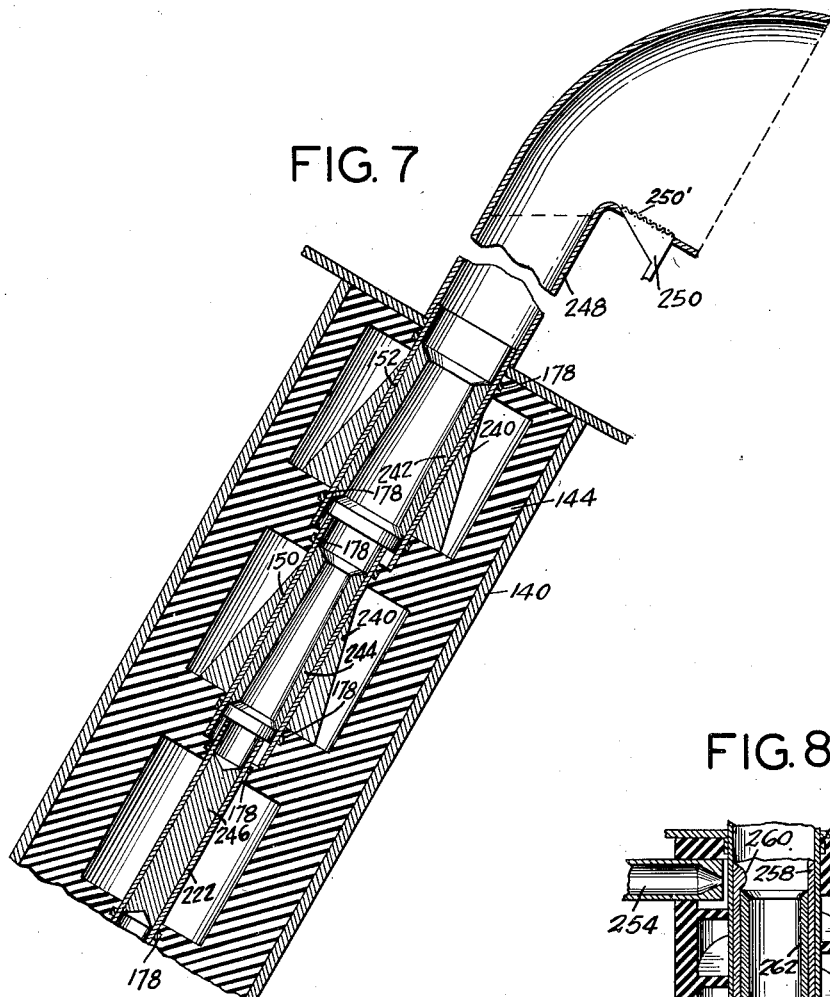
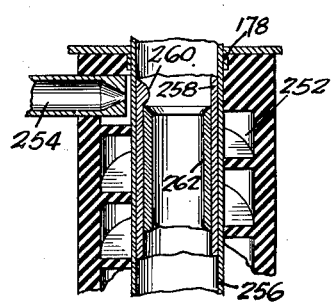
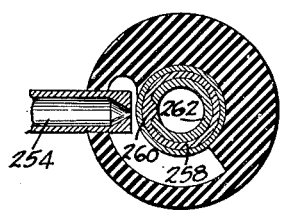
INVENTOR.
CROSBY FIELD
BY
Blair, Curtis & Hayward
ATTORNEYS.

Patented Feb. 26, 1952

2,586,802

UNITED STATES PATENT OFFICE 2,586,802

ICE-MAKING APPARATUS

Crosby Field, Brooklyn, N. Y., assignor to Flakice Corporation, Brooklyn, N. Y., a corporation of Delaware Application August 30, 1946, Serial No. 693,994

7 Claims. (Cl. 62—106)

This invention relates to the congealing of liquids and, more particularly, to the making of ice by freezing laminae or layers into large pieces of more or less regular configurations.

An object of this invention is to provide for the congealing of liquids such as water, cream, fruit juices and the like in a thoroughly dependable and practical manner. A further object is to provide for the freezing of liquids to form layers or laminae which may be frozen together to form large pieces of ice. A further object is to provide automatic apparatus for carrying out the above of such character as to be readily adaptable to varying conditions of use. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawings in which are shown several of many possible embodiments of the invention:

Figure 1 is a vertical section of one embodiment of the invention;

Figures 2 to 8, inclusive, are partially schematic vertical sections of seven other embodiments of the invention; and, Figure 9 is a horizontal section of the embodiment of Figure 8.

In the present application the term "ice" is at times used in its broader sense as meaning any type of congealed liquid. For example, this term may include all types of water and water-base frozen fluids, such as frozen fruit juices, frozen cream, etc. as well as non-aqueous base frozen fluids. In general, the present application relates to the freezing of thin layers of ice which are of such configuration that they may be fitted at least partially one within another, and these layers are referred to as laminae.

In accordance with the present invention, large pieces of ice are formed by two or more of these laminae, the thickness of the various laminae and the number which are frozen into one piece, as well as the size of the final product, depending upon the many considerations met with in the practice of the invention. The laminae are frozen upon freezing surfaces which in most of the illustrative embodiments of the invention are generally annular. The freezing surfaces may be cylindrical with the laminae being formed on an outer surface or on an inner surface. Generally speaking, the laminae are made in what may be termed sets or groups so that small laminae fit within larger ones, and those of each group are nested together to form a larger body of ice. The nesting operation is started either with the smallest laminae of the group which is nested into the next larger or with the largest lamina which is nested over the next smallest. However, with certain embodiments of the invention, the laminae are formed on a single freezing surface of such configuration that after each lamina is formed, it is moved away from the freezing surface a distance equal to the thickness of the next lamina, thus to provide a layer of liquid to be frozen.

The laminae may be handled individually so that one is moved in nesting relationship with respect to the adjacent one by either the action of gravity or by positive mechanical action. The laminae may be caused to fall one within another or they may float upwardly through unfrozen liquid one within another, and the movement may be controlled mechanically or by providing enlarged laminae sections such that an enlarged section on one lamina provides a stop against which the next lamina rests.

The term "harvesting" is used to refer generally to the removal of the ice from the freezing surface, and specifically to the manner in which the adhesion between the ice and the freezing surface is broken. This may be by heating the freezing surface with electrical resistors in contact with the freezing surface or there may be means to cause a flow of electric current through the freezing surface. For example, a heavy electrical current of low potential may be passed through the walls of a cylindrical freezing tube, or current may be induced in the freezing walls by setting up an induction field. This latter is referred to as induction heating and may involve a relatively high frequency potential.

In Figure 1 ice is formed by freezing two cylindrical laminae in coaxially positioned cylindrical tubes and the smaller of these laminae is nested within the larger and the laminae are then frozen together and harvested. The evaporator is formed by an outer shell 140 closed at the top and bottom by plates 142 and partially filled with insulating material 144 to form an upper evaporator chamber 146 and a lower evaporator chamber 148. Extending downwardly from the top of this assembly is a first freezing tube 150 and extending upwardly from the bottom is a second freezing tube 152. These freezing tubes are joined so that they overlap at a copper ring 154 and at the top and bottom there are similar rings 156 and 158, respectively.

During the freezing operation water is pumped from a sump tank 160 by a pump 162 through a pipe 164 into the top of freezing tube 150, and refrigerant is supplied to the evaporator chambers so that two cylindrical laminae of ice 166 and 168 are formed. In order to insure that the liquid is spread evenly on the inner surfaces of the freezing tubes, there is a centrally supported staff 170 which carries three spreader buttons 172. As the water flows down tube 150, the main portion of it flows along the tube walls, and water flowing or falling down the center of the tube is deflected by button 172 and thus is diverted toward the tube walls. Similar actions are obtained farther down where the water enters and passes down tube 152. The excess water flows through a screen 174 into sump tank 160 for recirculation and the level of the water in the sump tank is maintained by a float valve 176 connected to a source of liquid to be congealed.

At each end of each of the evaporator chambers is a header girdle 178 which is energized continuously to limit the vertical extent of the ice formations. Thus, the laminae are of predetermined length and they have inner tapers at their ends as indicated in the drawing. The relative sizes of tubes 150 and 152 are such that when laminae of the desired thickness have been formed in the tubes, the lamina from tube 150 will fit snugly within that of tube 152.

For harvesting, a heavy electrical current is passed from ring 156 to ring 154 and this heats tube 150 and causes lamina 166 to drop from the tube. Simultaneously, however, a solenoid 180 is energized and this projects the plastic forward end 182 of an armature 184 upwardly into the broken line position. Therefore, lamina 166 falls onto this plastic tip and is thus held nested within lamina 168. The freezing operation for tube 152 is continued with the result that the two laminae are frozen together. In the meantime the current has been disconnected from rings 154 and 156 and has been connected between rings 154 and 158 so that now tube 152 is heated so as to release the body of ice from the tube. Solenoid 180 is also deenergized and, therefore, when the bond is broken between lamina 168 and tube 152, the body of ice falls from the freezing tube. This body of ice is diverted to the left by a screen 174 onto an endless belt 186 which carries the ice into a bin 190.

Figure 2:
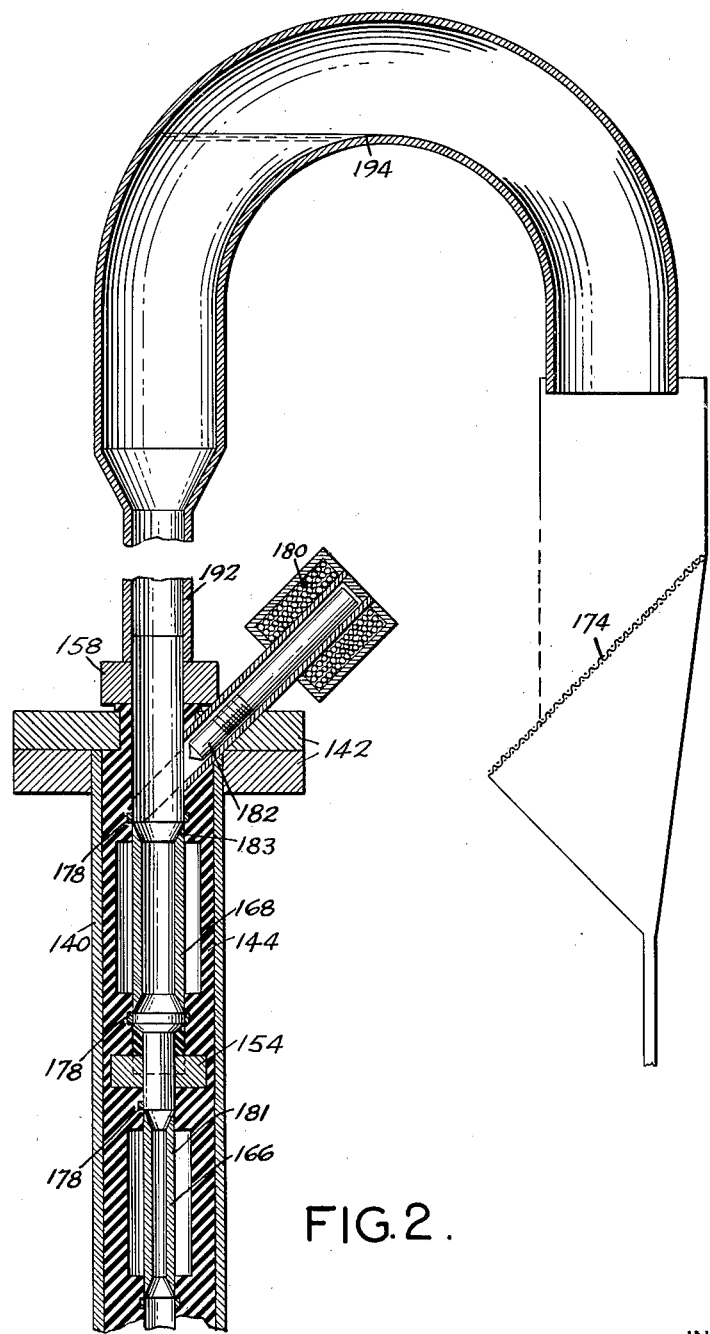

In the embodiment of Figure 2 the construction and operation is somewhat the same as in Figure 1 except that the freezing tubes are inverted and the water is passed upwardly through the tubes and out through a pipe 192. Furthermore, solenoid 180 is normally energized so as to hold the armature in the raised position shown, and the solenoid is deenergized only at the time of harvesting the smaller lamina 166. In this embodiment, lamina 166 floats upwardly when it is released and it is stopped by tip 182 of the armature when it is nested within lamina 168. When the body of ice is harvested it floats to the top of pipe 192 and the flow of water is such that the ice bodies pass over the top of the hump indicated at 194 and they fall down and are diverted to the left by screen 174 into a storage bin (not shown); the water is recirculated as in Figure 1.

Positioned on the outer wall of the smaller freezing tube 181 adjacent the upper girdle coil 178 is a thermocouple. This thermocouple is positioned slightly below the line which is the upper edge of lamina 166 when the lamina is of the full thickness desired; that is, as the lamina builds up from a thin cylinder in the manner pointed out above, the ice creeps up the tube toward girdle coil 178 and forms the tapered end as shown. The thermocouple is maintained above the freezing temperature until the adjacent portion of the freezing tube is covered by ice. However, immediately upon the ice reaching this point, the temperature of the thermocouple drops rapidly. This provides an accurate indication of the time at which the ice has reached the desired thickness and, therefore, when the temperature of the thermocouple drops, the harvesting operation is started. A similar thermocouple 183 is positioned on the outside of the upper end of the larger freezing tube 152. This thermocouple is also connected in the control circuit so as to initiate the harvesting operation at any time that lamina 168 has a predetermined thickness. In this way the harvesting operation is initiated alternatively by the two thermocouples with the assurance that the central hole in lamina 168 will always be large enough to receive lamina 166.

In the embodiment of Figure 3 the construction is similar to that of Figures 1 and 2. However, the refrigerant circuit is represented by the liquid refrigerant inlet pipe 196 at the top and the refrigerant gas outlet pipe 198 at the bottom and the two refrigerant chambers are connected by a pipe 200. Terminals 202 are shown for connecting the source of current to the girdle coils 178. Here the flow of water is from sump tank 160 through the pump 162 and upwardly through the freezing tubes. The rate of return of the water to the sump tank through a pipe 204 is controlled by a valve 206 so as to maintain the water level indicated. Air is supplied at the bottom of the freezing tubes through an air pipe 208 to improve the quality of the ice produced. During harvesting the smaller lamina 166 is held nested within lamina 168 by a cylindrical stop member 210 which is held at the level indicated by a rope 212 carried by a pulley 214. When the body of ice is harvested, this stop member is lifted so that the body of ice floats to the top of the flared open top of tube 216 and the ice body is removed manually.

The embodiment of Figure 4 is similar to that of Figure 3 except that the larger freezing tube 152 has a metal sleeve 230 fitted thereon and this sleeve covers the freezing tube throughout the freezing zone except at the top. Therefore, during the freezing operation there is more rapid heat-transfer at the top of the freezing zone than elsewhere with the result that the lamina 232 has an upper portion of enlarged thickness forming a flange 234. Therefore, when lamina 166 floats upwardly into nesting relationship within lamina 232, its upper end engages this flange 234 and the laminae are thus automatically nested. The upper end of the freezing unit opens into a tank 236 where the water level is maintained as indicated and when a number of the ice bodies accumulate in this tank, they pile up and some fall down a chute 238 into a bin (not shown).

In the embodiment of Figure 5 the arrangement is similar to that of Figure 4 with the freezing tubes being inverted so that harvesting is somewhat of the manner of the embodiment of Figure 1. During harvesting, lamina 166 is held in its proper nested position within shell 232 by the inwardly protruding flange. In this embodiment the refrigerant is ammonia and the evaporator is flooded during the freezing operation, there being a refrigerant inlet pipe 229 and an inlet valve 237. The gaseous refrigerant is withdrawn from the top of the evaporator through a normally open outlet valve 233. During the harvesting operation valve 233 is closed so that the evaporating refrigerant forms a gas pocket which drives the liquid refrigerant out of the evaporator chamber. The bottom of the evaporator chamber is connected through a pipe 235 having a relief valve 231 therein to the inlet pipe 229. Valve 231 is closed during the freezing operation so that the flow of refrigerant into the evaporator is controlled by valve 237. However, when the harvesting operation is started, valve 231 is opened so that the liquid refrigerant can flow unrestricted from the evaporator chamber. This insures rapid harvesting and efficient operation.

In the embodiment of Figure 6 the ice of lamina 239 is caused to build up at the top to form a hump 241 and the evaporator around the lower freezing tube is blocked so that lamina 243 is caused to build up to provide a slot 245 which is adapted to receive hump 241. Therefore, when lamina 243 is harvested and nested within lamina 239, hump 241 acts as a stop to properly position the smaller lamina. The evaporator chambers are formed by helical grooves 247 in a plastic evaporator shell 249. The refrigerant enters the upper evaporator section through an inlet pipe 251 and passes to the lower evaporator section through a pipe 253. The harvesting operation is performed by induction heating, there being a coil 255 surrounding each of the freezing tubes. The girdle coils 178 limit the formation of ice at each end of each of the freezing tubes.

In the embodiment of Figure 7 the arrangement is similar to that of Figure 4, but having three tubes. The freezing tube assembly is at an angle to the vertical and horizontal, and freezing tubes 150 and 152 are surrounded by tapered sleeves 240 so as to form tapered laminae 242 and 244. The lamina 246 in tube 222 is closed at its upper end and the laminae are nested together in the manner explained above with the inner taper on the tubes insuring proper nesting. The harvested bodies of ice float to the top of a tube 248 where they fall from the enlarged mouth into a bin (not shown). Water is drained from the mouth through a screen 250' into a water return system indicated at 250.

In Figures 8 and 9 an enlargement is formed on the upper end of each of the laminae except the smallest one by projecting the refrigerant into a helical evaporator chamber 252 through a nozzle 254. Thus, as the refrigerant enters the top of the evaporator chamber, it impinges against the wall of freezing tube 256 and the heat-transfer is therefore superior to that obtained elsewhere along the tube. Therefore, as lamina 258 builds up it has an integral hump 260 thereon which acts as a stop for the smaller lamina 262. When a large body of ice is built up by a number of laminae which are formed in the manner here shown, the refrigerant inlet nozzles 254 are disposed angularly around the freezing tubes so that the humps on the various laminae are angularly disposed with respect to each other. In this way the laminae tend to nest more closely and more accurately and all of the laminae are of substantially the same length. This result may be facilitated by forming the evaporator chamber in such a manner as to cause the side of the lamina opposite its hump to be notched or to be very thin. Thus, the notched or thin portion of the smaller lamina fits against and around the hump on the larger lamina.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In ice-making apparatus, the combination of, a vertical freezing tube construction comprising a rigid outer shell having top and bottom plates at the ends thereof and a concentrically positioned freezing tube projecting through said shell, said construction having insulating material in the annular space between said shell and said tube forming a plurality of evaporator chambers around spaced zones of said tube, said tubes being of different diameters at said zones whereby laminae of different diameters may be formed simultaneously, means to harvest the ice of smaller diameter and to automatically nest it in the ice of larger diameter while the freezing operation is continued on the ice of larger diameter, whereby the ice of smaller diameter is frozen to the ice of larger diameter to form a composite ice body, and means to harvest the ice body.

2. In ice-making apparatus, the combination of, a vertical freezing tube construction comprising a rigid outer shell having top and bottom plates at the ends thereof and a concentrically positioned freezing tube projecting through said shell, said construction having insulating material in the annular space between said shell and said tube forming a plurality of evaporator chambers around spaced zones of said tube, said tubes being of different diameters at said zones whereby laminae of different diameters may be formed simultaneously, means to harvest the ice of smaller diameter and to automatically nest it in the ice of larger diameter while the freezing operation is continued on the ice of larger diameter, said apparatus including a movable stop member which is adapted to move to and from a position werein it stops the ice of smaller diameter in a position wherein it is nested in the ice of larger diameter whereby the ice of smaller diameter is frozen to the ice of large diameter to form a composite ice body, and means to harvest the ice body.

3. Apparatus as described in claim 2 wherein said means to stop the ice is a slidable plunger which is adapted to slide radially between a stop position wherein its end is substantially in alignment with the end of the ice of larger diameter and a position wherein it is entirely outside of said freezing tube, a fixed shell surrounding said plunger and providing a guiding support therefor.

4. Apparatus as described in claim 3 which includes an electromagnet coil mounted on said fixed shell and surrounding a portion remote from the freezing tube, said plunger having a magnetic portion which is adapted to be moved along said fixed shell by the energization of said electromagnet coil.

5. Apparatus as described in claim 4 wherein said plunger includes a tip portion having a conical end surface, and wherein said plunger is mounted in said fixed shell at an angle of substantially forty-five degrees from the axis of the freezing tube.

6. In ice-making apparatus, a plurality of freezing tubes of different diameters presenting inner freezing surfaces upon which laminae of ice of different diameters are formed, means to cause an increased rate of freezing throughout one portion of the larger of said laminae whereby the smaller of said laminae will nest within said larger lamina but will not pass therethrough, means to harvest said smaller lamina, means utilizing gravity to hold said smaller lamina in nesting relationship within said larger lamina until the two laminae are frozen together, and means to harvest the body of ice thus formed.

7. In ice-making apparatus: a plurality of freezing tubes of different diameters presenting inner freezing surfaces upon which laminae of ice of different diameters are formed; means to harvest the small lamina; an assembly utilizing gravity to hold said smaller lamina in nesting relationship within the next larger lamina until the two laminae are frozen together comprising, a solenoid, a plunger formed of an armature with a plastic tip thereon, and a tube which is open at one end to the end of the larger freezing tube and which carries said solenoid at the other end with the plunger being adapted to slide to and from a position wherein the plastic tip extends into the adjacent freezing tube to stop said smaller lamina in nested position within said larger lamina; and means to harvest the body of ice thus formed.

CROSBY FIELD.

REFERENCES CITED

The following references are of record in the file of this patent:

UNITED STATES PATENTS

| Number | Name | Date |
|---|---|---|
| 208,304 | Gamgee | Sept. 24, 1878 |
| 278,527 | Fordham | May 29, 1883 |
| 1,936,575 | Barrett et al. | Nov. 28, 1933 |
| 2,006,623 | Barrett et al. | July 2, 1935 |

FOREIGN PATENTS

| Number | Country | Date |
|---|---|---|
| 2,356 | Great Britain | July 27, 1868 |
| 14,925 | Great Britain | Nov. 2, 1887 |